United States Patent
Aura

(10) Patent No.: US 6,373,949 B1
(45) Date of Patent: Apr. 16, 2002

(54) METHOD FOR USER IDENTITY PROTECTION

(75) Inventor: Tuomas Aura, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/418,387

(22) Filed: Oct. 14, 1999

Related U.S. Application Data

(63) Continuation of application No. PCT/FI98/00291, filed on Apr. 1, 1998.

(30) Foreign Application Priority Data

Apr. 16, 1997 (FI) .................................................. 971619

(51) Int. Cl.⁷ ................................................ H04K 1/44
(52) U.S. Cl. ...................... 380/247; 380/248; 380/249; 380/259; 380/270; 380/44; 380/46; 455/410; 455/422; 455/432; 455/436; 455/437
(58) Field of Search ................................ 380/248, 250, 380/258, 259, 270, 271, 272, 44, 46; 455/410, 422, 432, 436, 437; 370/313

(56) References Cited

U.S. PATENT DOCUMENTS

| | | | |
|---|---|---|---|
| 5,371,794 A | * 12/1994 | Diffie et al. | 380/21 |
| 5,467,381 A | * 11/1995 | Peltonen et al. | 379/58 |
| 5,537,474 A | * 7/1996 | Brown et al. | 380/23 |
| 5,557,654 A | * 9/1996 | Maenpaa | 379/58 |
| 5,661,806 A | * 8/1997 | Nevoux et al. | 380/25 |
| 5,689,810 A | * 11/1997 | Shaughnessy et al. | 455/54.1 |
| 5,765,105 A | * 6/1998 | Kuriki | 455/410 |
| 6,119,000 A | * 9/2000 | Stephenson et al. | 455/432 |

FOREIGN PATENT DOCUMENTS

| | | |
|---|---|---|
| EP | 0651533 | 5/1995 |
| EP | 0675615 | 10/1995 |
| GB | 2279540 | 1/1995 |
| JP | 8018552 | 1/1996 |

OTHER PUBLICATIONS

9/96 ETS 300 392–7. European Telecommunications Standards Institute, pp. 18–23.

* cited by examiner

Primary Examiner—Phung M. Chung
Assistant Examiner—Paul E. Callahan
(74) Attorney, Agent, or Firm—Altera Law Group

(57) ABSTRACT

In the method in accordance with the present invention, the subscriber identifier to be sent to the transmission network is encrypted using a cipher key common to a specific group of subscribers, and a random number is attached to the identifier to be sent to the network. For example, a subscriber group may consist of the subscribers to a single given operator. The section of the identifier specifying the subscriber group is sent to the network in a non-encrypted format, in which case the network is able to direct the encrypted message to such a network element where it can be deciphered.

7 Claims, 4 Drawing Sheets

METHOD FOR USER IDENTITY PROTECTION

This is a continuation of PCT/FI98/00291 filed Apr. 1, 1998.

FIELD OF THE INVENTION

The present invention relates to the transfer of subscriber identity in a protected format in a telecommunications network, particularly in mobile communications systems.

BACKGROUND OF THE INVENTION

Protecting subscriber identity means the concealment of the identity of a user of a telecommunications network from outsiders. Protection of identity is of special importance in mobile communications systems, where the subscriber and the network identify themselves to each other before the connection is made. If subscriber identity is transferred unprotected, it is possible to follow the movements of the subscriber by monitoring the radio connections established between the subscriber and the network. In addition, by protecting the subscriber's identity it is possible to considerably complicate the deciphering of data communications. Protection of subscriber identity may be desirable in fixed network systems as well. In circuit-switched systems of a fixed telephone network, the subscriber identity is determined by the subscriber line, and thus subscriber identity is not transferred as a message; instead, it is always determined by the subscriber line used. In packet-switched systems, the subscriber identity is transferred in each data packet sent by the subscriber, and so the subscriber identity can be fully concealed using encryption methods suitable for use in mobile communications systems.

FIG. 1 illustrates a known mobile communications network. The figure shows two mobile services switching centres MSC1, MSC2, base station controllers BSC, base transceiver stations BTS, a mobile station MS, a home location register HLR, and an authentication centre AUC typically located in association with a HLR. The mobile services switching centres are capable of establishing signalling connections with the home location register HLR and the authentication centre AUC.

Each mobile subscriber has a home public land mobile network HPLMN operated by an operator with which the subscriber has concluded an agreement. The user's subscriber data is stored in the home location register HLR of his home public land mobile network and the related authentication centre AUC. The authentication centre has all the data necessary for verifying the authenticity of the identity communicated by the user. In the home location register HLR, the mobile subscriber international ISDN number MSISDN can be linked to the user's international mobile subscriber identity IMSI. In addition, information on the services ordered by the subscriber as well as the user's current location to an accuracy within the visitor location register VLR address is stored in the home location register. No subscriber can be registered with more than one visitor location register VLR at any given time.

The visitor location register VLR located in association with the mobile services switching centre MSC is also used to maintain data on the location of users registered with the applicable visitor location register to an accuracy of a so called location area. In addition to the services offered by the home public land mobile network HPLMN, a subscriber can use the services available in those other visited public land mobile networks VPLMN with which his own operator has signed a roaming agreement.

Through the mobile services switching centres MSC, mobile communications systems are linked to fixed telephone networks, such as a public switched telephone network PSTN or an integrated services digital Network ISDN. Several base transceiver stations BTS are connected to a base station controller BSC. The base transceiver stations are capable of making connections with mobile stations MS consisting of mobile equipment ME and subscriber identity modules SIM using channels of the so called air interface.

In mobile communications systems representing prior art, the objective is to transmit subscriber identity protected across the air interface. For example, the known GMS system uses a temporary mobile subscriber identity TMSI illustrated in FIG. 2 to conceal the user's international mobile subscriber identity IMSI.

As shown in FIG. 2, information about the temporary mobile subscriber identity TMSI is only stored in the user's visited location register VLR and mobile station MS. When the network and the mobile station contact each other, the temporary mobile subscriber identity, if available, is always used for identification instead of the international mobile subscriber identity IMSI. TMSI consists of two components, one being the location area code LAI and the other the temporary subscriber identity code TIC (TMSI Code) that uniquely identifies the user within the location area. The TIC code is unique within one location area LAI. Information about the temporary mobile subscriber identity TMSI is not transmitted to the home location register HLR; instead, the temporary mobile subscriber identity TMSI used across the air interface is always converted in the visited location register VLR into the international mobile subscriber identity IMSI. For communications between the home location register HLR and the visited location register VLR, the permanent identification IMSI is always used for subscriber identification purposes.

FIG. 3 illustrates the generation and maintenance of the temporary mobile subscriber identity TMSI. VLR assigns a mobile station a new temporary identity, for example in connection with each location update. The mobile station sends to the network a non-encrypted LOCATION UPDATE REQUEST 301 to identify itself using the temporary mobile subscriber identity TMSI, if defined, and communicates its previous location area. The request must be transmitted non-encrypted because the network has no previous information on the user's identity or user-specific encryption keys. The request is forwarded to the visited location register VLR. When receiving the request, the visited location register requests the necessary information from the user's previous visited location register on the basis of the previous location area data. At this point, the network directs the mobile station to activate cipher mode (phase 302, CIPHER MODE COMMAND) and the mobile station acknowledges the command (phase 303, CIPHER MODE COMPLETE). The network indicates acceptance of the location update (phase 304, LOCATION UPDATE ACCEPT) and gives the user a new temporary mobile subscriber identity TMSI (305, TMSI REALLOCATION COMMAND), in response to which the mobile station acknowledges the new identity (306, TMSI REALLOCATION COMPLETE). The new TMSI can also be incorporated in the phase 304 message LOCATION UPDATE ACCEPT, in which case the phase 305 TMSI REALLOCATION COMMAND is not used.

Where possible, the GSM system always uses the temporary mobile subscriber identity TMSI that conceals the subscriber's true identity. To ensure that TMSI can be used, it must be possible to link it to the international mobile subscriber identity IMSI in the visited location register VLR.

However, this is not possible when the user contacts the network for the first time. Additional problems are created by situations where VLR, due to loss of data caused by a malfunction, is incapable of linking the temporary mobile subscriber identity TMSI to the international mobile subscriber identity IMSI. For this reason, the network may always ask the mobile station to send the original IMSI, which will then, in response, be transmitted in a non-encrypted format by the mobile station.

Another known method for protecting user identity in transmission is the technique used in the TETRA system. Similarly to the GSM system, the TETRA system may employ an encryption procedure called alias short subscriber identity ASSI, which is based on temporary identity. In addition to, or instead of, ASSI, TETRA may also use encrypted short identity ESI, which is described in greater detail in the ETS 300 392-7 Specification published by ETSI (European Telecommunications Standards Institute).

Generation of the encrypted short identity ESI is illustrated in FIG. 4. The encrypted short identity ESI is computed using the algorithm TA61 and the SSI identity and the common cipher key CCK that is common to several users, or the static cipher key SCK, as input data.

The static cipher key SCK is always used before the authentication process is carried out. A maximum of 32 static cipher keys, to be identified by the identification number SCKN (SCK Number) sent by the network to the mobile station, can be associated with any single subscriber identity. A common SCK is assigned to all those mobile stations in a single switching and management infrastructure SwMI that have access to the network section concerned.

The common cipher key CCK assigned to several users and, if necessary, changed by the network, is sent to the subscribers in a format encrypted with the derived cipher keys DCK provided by the authentication process, which means that it cannot be used until authentication is completed. Only one common cipher key CCK may be operative in the location area at any given time. As it is, all the mobile stations in the same location area can decipher any identity encrypted with the common cipher key CCK.

The problem of the arrangement described above is that several mobile stations know the cipher key and can thus decipher identity. Since all changes to the cipher key are always done by the network, the same encrypted short identity ESI is typically used several times. Third, the network with which the mobile station communicates, learns the identity of the mobile subscriber even when it does not need to know it.

The objective of the present invention is to eliminate these problems associated with prior art. This objective is achieved by using the method described in the independent patent claims.

SUMMARY OF THE INVENTION

The idea of the invention is to encrypt the subscriber identity data to be sent to the transmission network using a cipher key common to a certain group of users and a random number which is sent to the network attached to the encrypted identity data. Such a group of users may consist of all the subscribers of a given operator, all the users in one home location register, or any group of users defined within one home location register.

The transmission network must be capable of routing the message containing the identity of the subscriber to the subscriber's home public land mobile network or other network defined as reliable. Therefore, the network must be able to identify the subscriber with the accuracy necessary for routing, such as to within the subscriber's home network or home location register. It is advantageous to protect the identity without, however, encrypting the component identifying the user's home public land mobile network.

BRIEF DESCRIPTION OF THE DRAWINGS

The invention is described in greater detail with reference to the accompanying drawings, where.

DETAILED DESCRIPTION OF THE INVENTION

The invention is described below using a mobile communications system as an example. However, the scope of the invention is not limited to user identity protection in mobile communications systems, but the invention can be used in fixed network systems as well.

Figure 1:
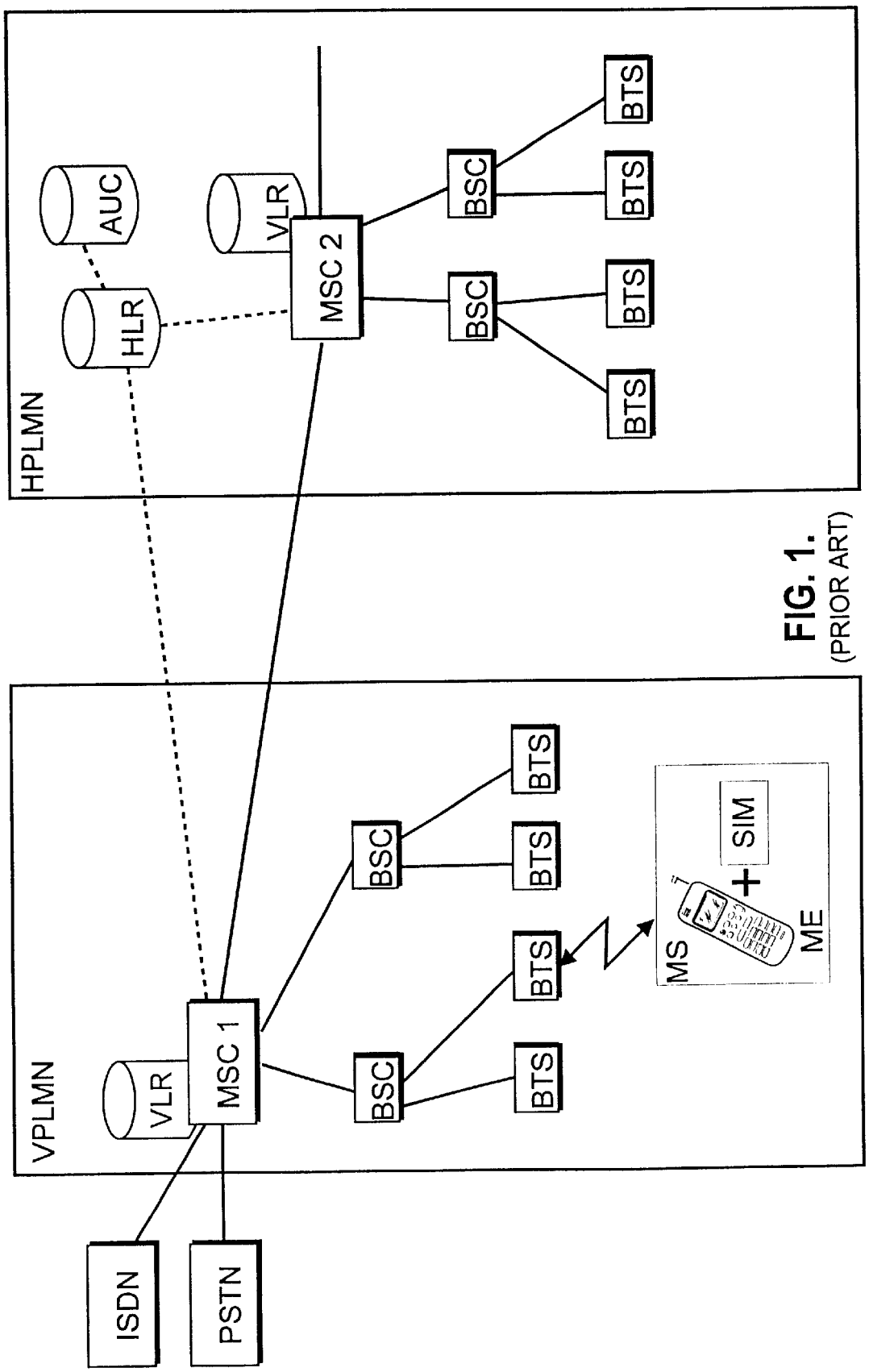
FIG. 1 shows the structure of a mobile communications system and its network elements involved in authentication.
Figure 2:
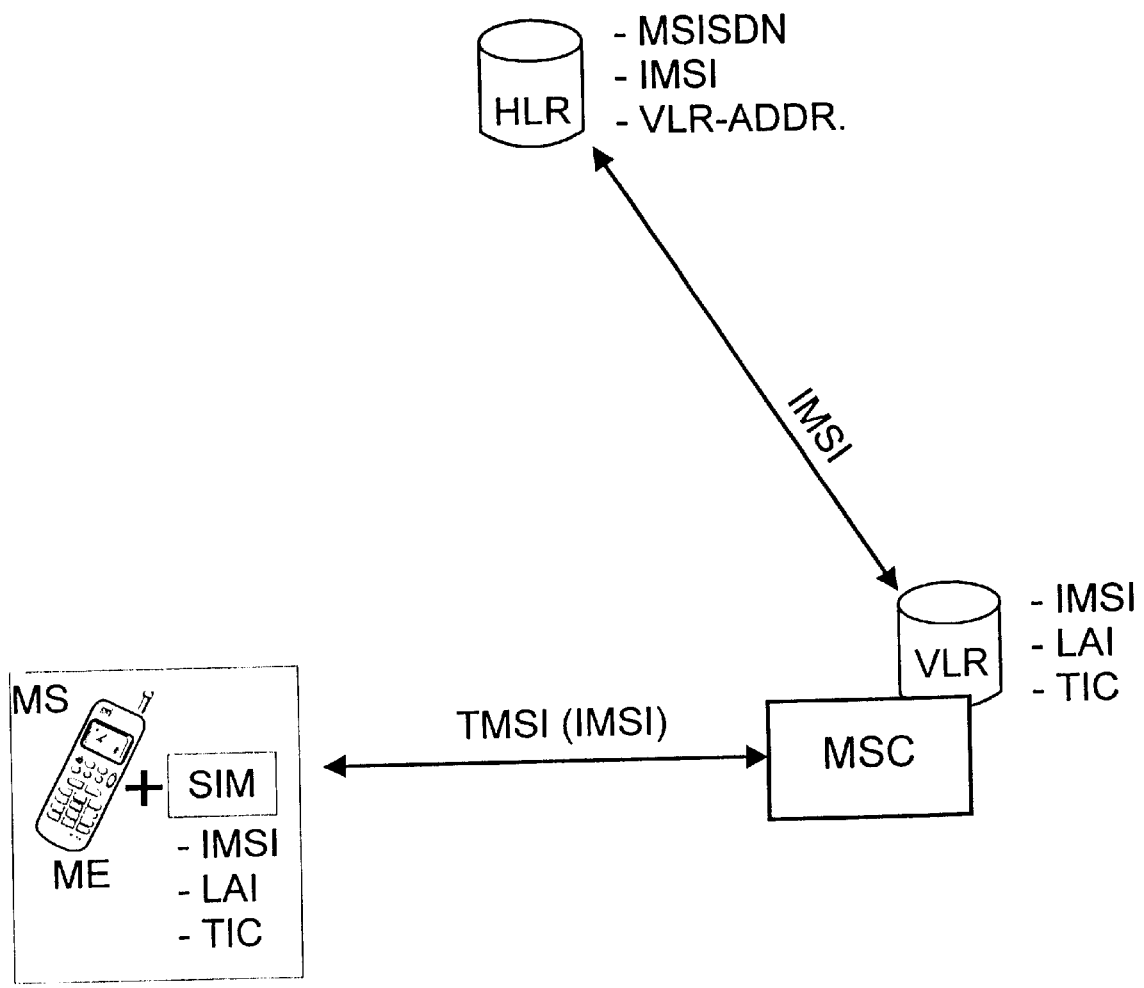
FIG. 2 shows a known method for protecting the identity of the subscriber based on the use of a temporary identifier.
Figure 3:
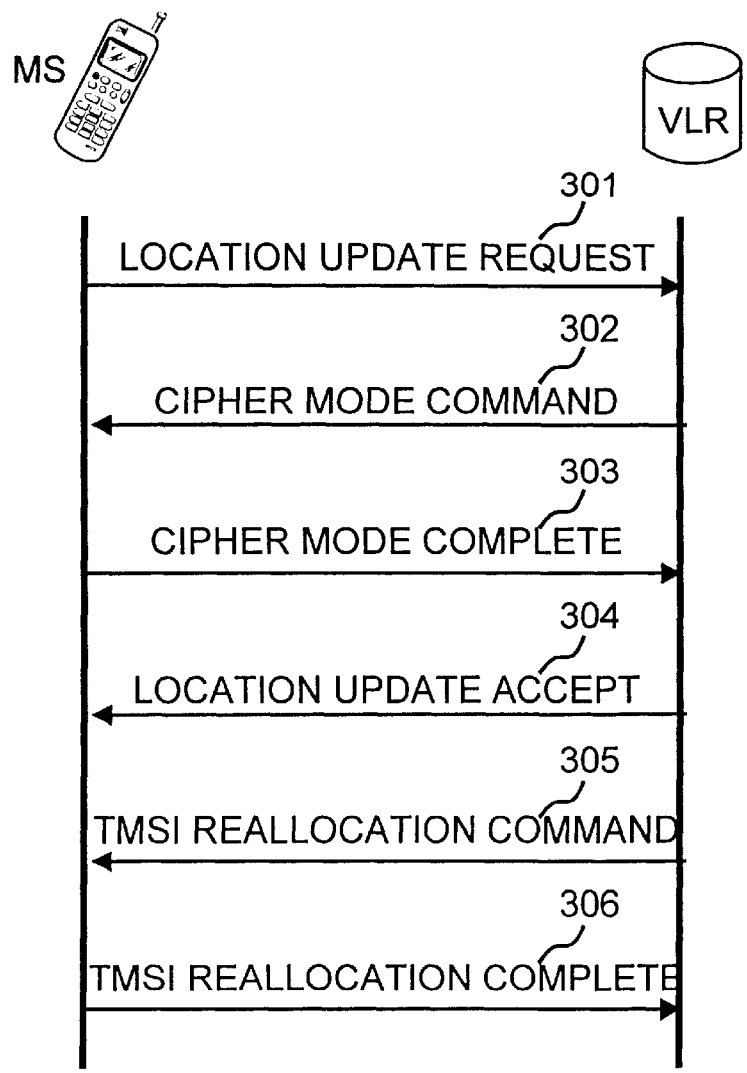
FIG. 3 shows a procedure for changing the temporary subscriber identity.
Figure 4:
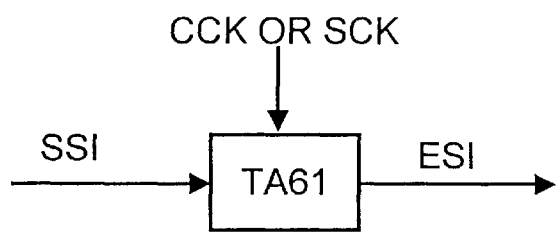
FIG. 4 shows a known method for protecting the identity of the subscriber based on concealing the identity.
Figure 5:
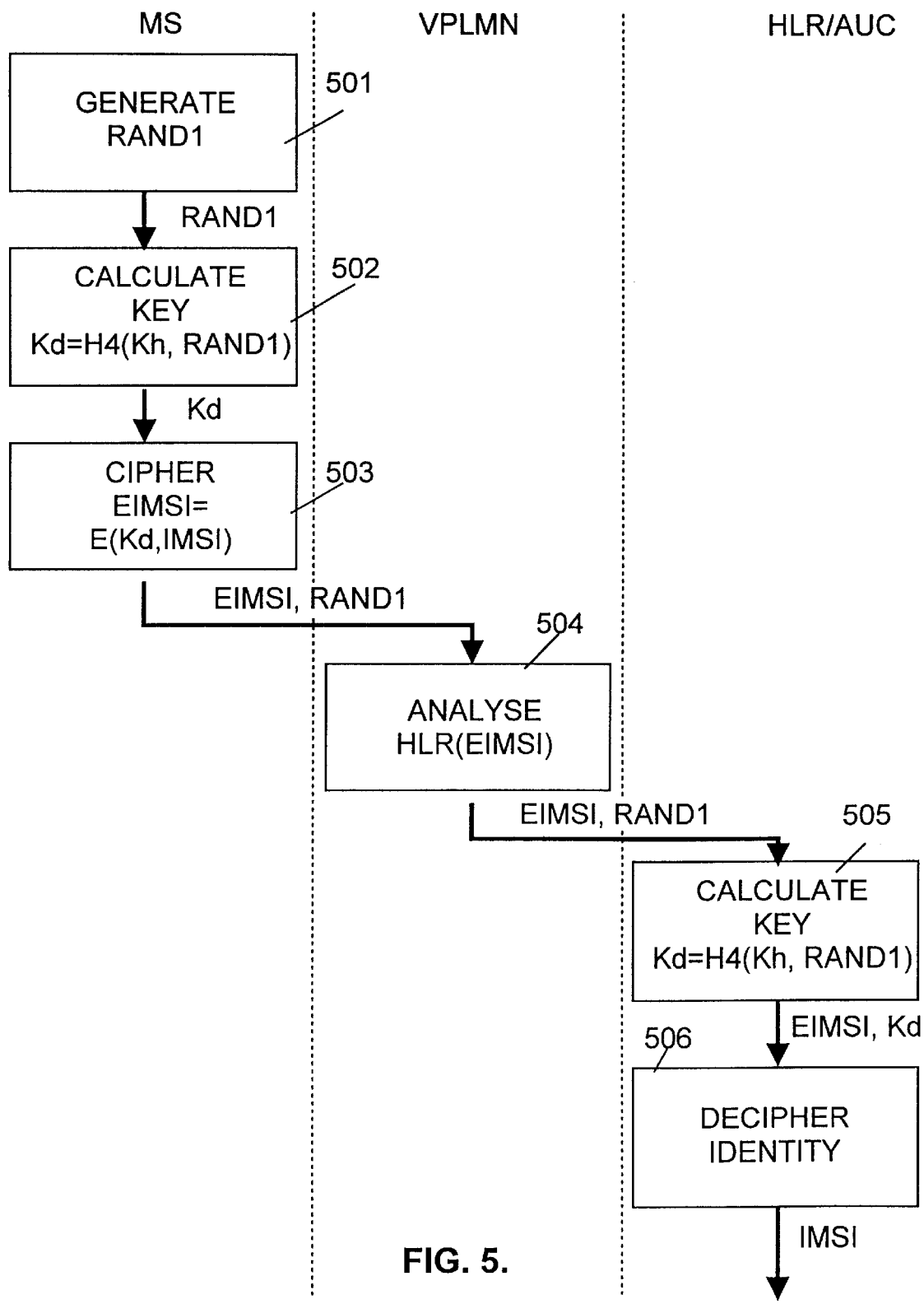
FIG. 5 shows a method in accordance with the present invention for protecting the identity of the subscriber.

By means of the present invention, the problem of disclosure of identity is eliminated by delivering the international mobile subscriber identity IMSI to the subscriber's home network or other network defined as reliable in an encrypted format in such a way that the network receiving the encrypted messages is nevertheless capable of routing the message correctly. A method in accordance with the present invention can, for example, be implemented by using the algorithm presented in FIG. 5. In the algorithm in accordance with FIG. 5, the mobile station MS (more generically, subscriber station), first generates, in phase. 501, the random number RAND1. Any random number already generated in the authentication phase may be used for random number RAND1. What is essential is that a mobile station never uses the same random number several times for protecting its identity. In phase 502, the mobile station generates the cipher key Kd using the one-way hash function H4. For input data for the function, the random number RAND1 and the HLR-specific key Kh are used. The Kh key is embedded in the subscriber identity module SIM in such a way that it cannot be accessed other than by breaking the module.

The hash function H4 must be a one-way function complete with a key. The following shall apply:
1. when Kh and RAND1 are defined, a unique H4(Kh, RAND1) is easy to compute;
2. when RAND1 is defined but the Kh key is unknown, it is impossible, or at least extremely difficult, to compute H4(Kh, RAND1);
3. when a large number of random numbers RAND1 and the corresponding values of the hash function H4(Kh, RAND1) are defined, but the Kh key is unknown, it is impossible, or at least extremely difficult, to compute the Kh key; and
4. when a large number of random numbers RAND1 and the corresponding values of the hash function H4(Kh, RAND1) are defined, but the Kh key is unknown, it is impossible, or at least extremely difficult, to compute the value of the hash function H4(Kh, RAND1') for the given input RAND1', if the value is previously unknown.

Examples of known hash functions that use keys include HMAC (Hash-based Message Authentication Code) algorithms based on the SHA (Secure Hash Algorithm) and MD5 (Message Digest Algorithm 5) algorithms and the GSM system algorithms A3 and A8.

In phase 503, the mobile station encrypts its IMSI identity using the Kd key and IMSI identifier as input data for the cipher algorithm E and sends its encrypted identity and the random number RAND1 to network VPLMN. The network receives the message. To transmit the subscriber's message to the correct home location register, the network must be able to determine the subscriber's HLR address from the message. To achieve this, it is preferable to use the E algorithm as the cipher algorithm, because it leaves the HLR-specified section of the identifier non-encrypted. Typically, the subscriber IMSI identifier is of the type IMSI=HLR address+the data identifying the subscriber within the HLR. Of this identifier, the cipher algorithm must then retain the HLR address component intact and only encrypt the data identifying the subscriber within the HLR.

After determining the subscriber's home location register address from the message received, the network forwards the message containing the encrypted identifier data EIMSI and random number RAND1 to the home location register HLR. However, the network is unable to determine the true IMSI identity of the subscriber. Because the identifier data is always encrypted using a fresh, not-previously-used random number RAND1, the network is similarly unable to make a connection between the encrypted identities of the user and thus monitor the user's movements.

In phase 505, HLR computes the cipher key Kd by means of the key Kh known to it and the random number RAND1 received from the mobile station. In phase 506, HLR deciphers the subscriber identifier IMSI using the Kd key and the encrypted EIMSI identity provided by the mobile station.

Since the Kh key is only known to the mobile station and its home location register, any eavesdropper listening in on the transmission path between the mobile station and its home location register is unable to learn the subscriber's identity. Naturally, the eavesdropper can figure out the subscriber's home location register address but cannot determine the subscriber's individual identity from among the subscribers in the home location register that typically contains several hundreds of thousands of subscribers. Furthermore, since the identifier data is always encrypted using a fresh, not-previously-used random number RAND1, the eavesdropper is similarly unable to link the various encrypted identities used by the subscriber and thus monitor the subscriber's movements.

The cipher key Kh need not necessarily be identical to all the mobile subscribers in a given home location register. In such a situation, the home location register must, nevertheless, be able to determine the Kd key to be used from the message transmitted by the mobile station. This can be accomplished, for example, by dividing the subscribers in the home location register into groups, within which an identical key is used, and by attaching the group identifier to the message sent by the mobile station to the network. For example, this can be achieved by setting up such groups on the basis of the first digit of the subscriber section in the IMSI identifier and transmitting the first digit of the subscriber section non-encrypted. By doing so, it is possible to further complicate the deciphering of the Kh key, because even if one key were successfully deciphered, this information could no longer be used for disclosing the identities of all the other users in the network. However, the amount of identifier data transmitted in a non-encrypted format increases. As a result, the group of subscribers, to which an individual subscriber, on the basis of encrypted identifier data and without deciphering, may be assumed to belong, decreases.

For subscribers whose home public land mobile network HPLMN includes several home location registers HLR, encryption can also be carried out in such a way that only the subscriber's HPLMN can be determined from the encrypted EIMSI identifier. Then, the messages transmitted by the subscriber under the concealed identity are routed within the HPLMN to a specific home location register HLR specified for deciphering.

Segregation of the computation of the Kd cipher key from the protection of identity is not of the essence in the present invention. The protected identity can equally well be computed directly using a single function EIMSI=E(IMSI, Kh, RAND1).

Although the above embodiments of the invention are discussed in relation to a mobile communications network, the scope of the invention is not limited thereto. The method is equally suited for user identity protection in fixed networks.

Obviously, the potential embodiments of the invention are not limited to the above embodiments presented by way of example, but may vary within the scope of the attached patent claims.

What is claimed is:

1. A method for protected transmission of user identity to the user's home network in a data communications system that includes at least, subscribers each with a unique identifier and a home network, subscriber stations of the subscribers, at least one data communications network including network elements, and in which connections can be made between mobile stations and the data communications network, the method comprising:

dividing an identifier into a first and second section in such a way that the first section includes data necessary for identifying a subscriber group and the second section identifies a subscriber within the subscriber group generating a random input at a subscriber station, encrypting the second section of the subscriber's identifier using the random input and a cipher key specific to each subscriber group, sending a message to a network element of a data communications network, the message containing a partially encrypted identifier consisting of the first section and the encrypted second section and the random input used, routing the message from the data communications network to the subscriber's home network, and deciphering the identifier in the subscriber's home network.

2. The method in accordance with claim 1, where the subscriber identifier consists of a section specifying the subscriber's home network and another section specifying the subscriber within the subscriber's home network, wherein the group of subscribers consists of subscribers within a single home network and that the encrypted section of the identifier is that part of the identifier that determines the subscriber's identity in the home network.

3. The method in accordance with claim 1, where the subscriber identifier consists of a section specifying one Home Location Register and another section specifying the subscriber within the Home Location Register, wherein the group of subscribers is a group within one Home Location Register and that the encrypted section of the identifier is that part of the identifier that determines the subscriber's identity within the Home Location Register.

4. The method in accordance with claim 1, where the subscriber identifier consists of one section defining a group of subscribers within one Home Location Register and another section defining the subscriber within the subscriber group, wherein the subscriber group is a group of subscribers defined within one Home Location Register and that the encrypted section of the identifier is that part of the identifier that determines the subscriber's identity within the subscriber group.

5. The method in accordance with claim 1, wherein the random input is specifically generated by means of a random number generator.

6. The method in accordance with claim 1, wherein for the random input, a random number already generated for the authentication process is used.

7. The method in accordance with claim 1, wherein the subscriber station is a mobile station operating in a mobile communications system and that the data communications network is a mobile communications network.

* * * * *